Figure 1:
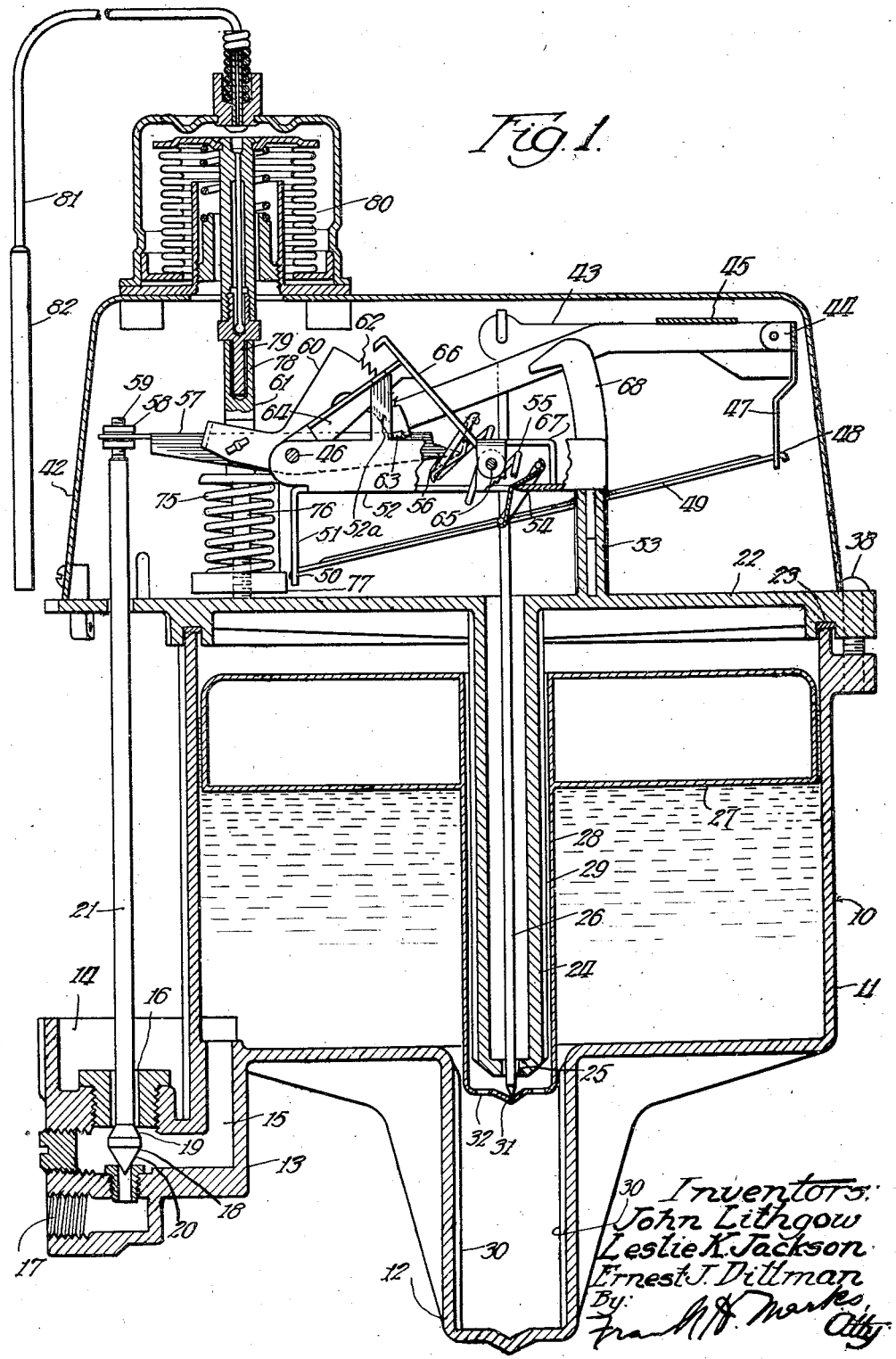

March 24, 1942.    J. LITHGOW ET AL    2,277,237
CONTROL MECHANISM FOR A LIQUID FUEL BURNER
Filed Oct. 4, 1939    3 Sheets-Sheet 1

Inventors:
John Lithgow
Leslie K. Jackson
Ernest J. Dittman
By: Frank A. H. Marks
Atty.

March 24, 1942.    J. LITHGOW ET AL    2,277,237
CONTROL MECHANISM FOR A LIQUID FUEL BURNER
Filed Oct. 4, 1939    3 Sheets-Sheet 2

Inventors:
John Lithgow
Leslie K. Jackson
Ernest J. Dittman
By Frank H. Marks Atty.

March 24, 1942.   J. LITHGOW ET AL   2,277,237
CONTROL MECHANISM FOR A LIQUID FUEL BURNER
Filed Oct. 4, 1939   3 Sheets-Sheet 3

Inventors:
John Lithgow
Leslie K. Jackson
Ernest J. Dittman
By Frank H. Marks, Atty.

Patented Mar. 24, 1942

2,277,237

UNITED STATES PATENT OFFICE 2,277,237

CONTROL MECHANISM FOR LIQUID FUEL BURNERS

John Lithgow and Leslie K. Jackson, Cleveland, Ohio, and Earnest J. Dillman, Detroit, Mich., assignors to Sears, Roebuck and Co., Chicago, Ill., a corporation of New York Application October 4, 1939, Serial No. 297,958

6 Claims. (Cl. 137—68)

Our invention relates to a control mechanism for a liquid fuel burner, and more particularly our invention relates to control mechanism especially adapted to control the heating period of a liquid fuel burner for an intermittent absorption refrigeration system.

The control mechanism herein described and claimed is of a type employing a single thermostatic power element and is a modification of the control mechanism disclosed and claimed in the co-pending application of John Lithgow and Leslie K. Jackson, Serial Number 291,986, filed Oct. 25, 1939.

The control mechanism herein described possesses all of the advantages of the control mechanism described in the aforementioned co-pending application. It furnishes a positive control for the amount of fuel supplied to the burner of the refrigeration unit and therefore is a positive control of the amount of refrigerant supplied to the evaporator of the system. In prior art control units, several thermostatic power elements were generally used. As a rule, one of these thermostatic elements or bulbs was located in the evaporator of the refrigeration unit and a second in the generator. The first power element was effective to supply fuel through the controlling mechanism to the burner, thus initiating a generating cycle. The second thermostatic power element which was located in the generator was effective to terminate the supply of fuel to the burner, stop the generating period and initiate an absorption or refrigerating period. The second thermostatic power element was usually not very effective for the purpose intended. Inasmuch as toward the end of the generating period the change in temperature in the generator is relatively slight over a long period of time, it is obvious that the controlling element was necessarily very critical.

In some instances, a third controlling element or ambient control exposed to temperature of the room in which the refrigerator was located was used. The use of this third controlling element also gave rise to difficulties in many instances. This was particularly true since the ambient control was usually intended to modify the action of the thermostatic power element responsive to generator temperatures. The addition of this balancing ambient element to effect a modification in the control through the generator power element naturally doubled the possibility of control defects. Furthermore, the wide range of temperature, through which the ambient element should necessarily regulate, increased the possibility of inaccuracy throughout the entire range. Another undesirable feature in the ambient element is evident when the effect of a defective ambient bulb is considered. The function of this element, as described previously, is to offer a resistance to the generator power element and, if the ambient bellows for some reason fails, then the generator element could have no resisting member, which would mean that the generator element would respond to shut off the fuel supply earlier than desired. This, therefore, would offer a disadvantage in that the control could not be operated manually in a satisfactory manner pending the replacement of a new ambient element.

The use of three power elements necessitated a relatively complex controlling linkage which often needed frequent adjustments.

It is one of the objects of our invention therefore to provide a compact controlling unit for an intermittent absorption refrigeration system which is effective to positively control the amount of fuel supplied to the burner in order to limit the length of the generation period.

Another object of our invention is to provide a controlling mechanism compactly housed in a single casing member.

A third object of our invention is to provide a casing member for a control element adapted to receive a controlling float and an operating valve.

Still another object of our invention is to provide in an integral casing member a metering chamber and a controlling trough-like portion capable of regulating the flow of fuel to the burner of the unit.

Various other objects and advantages of our invention will be apparent from the subsequent description and drawings.

Figure 2:
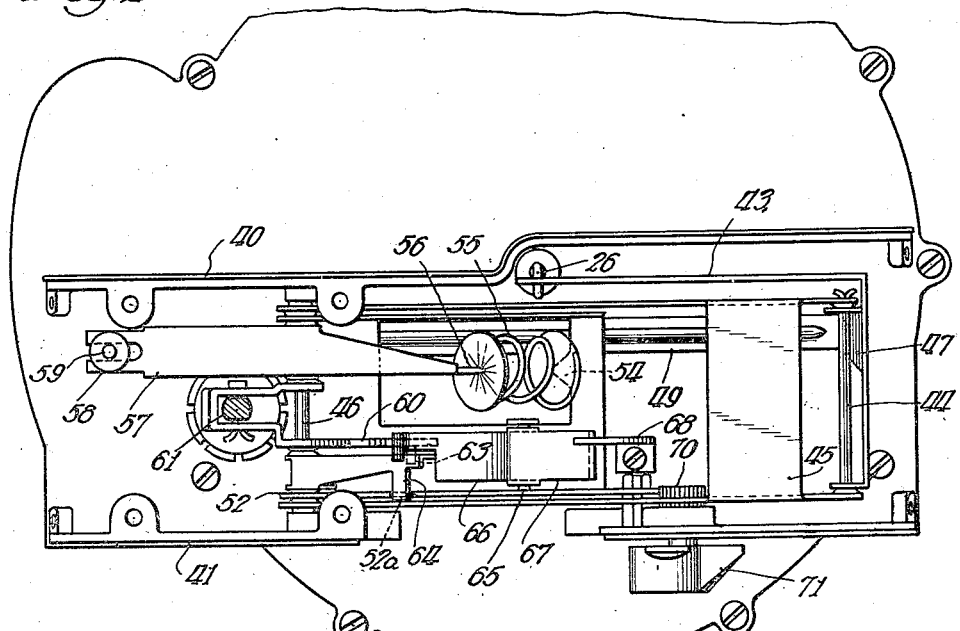
Figure 3:
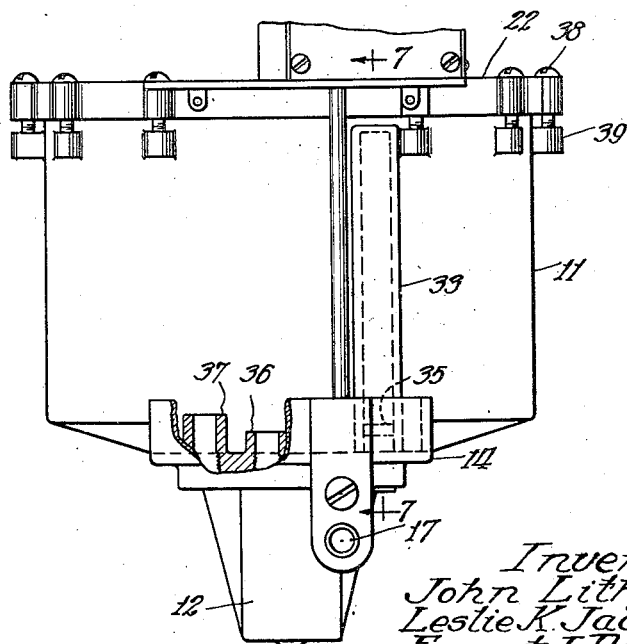
Figure 4:
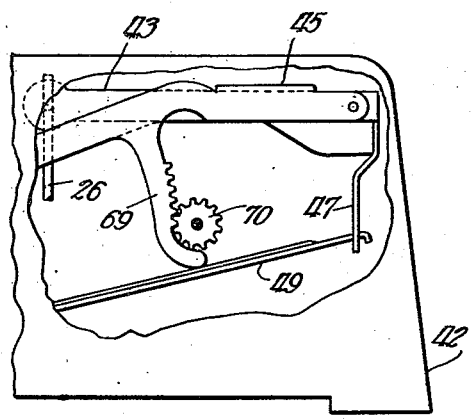
Figure 5:
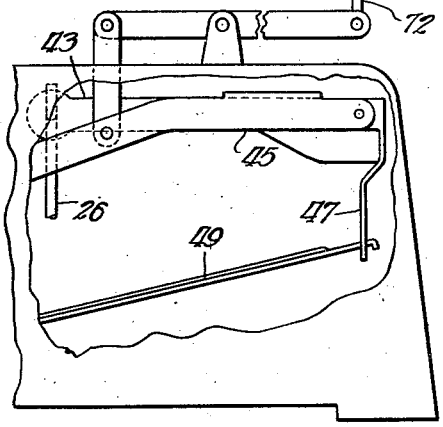
Figure 6:
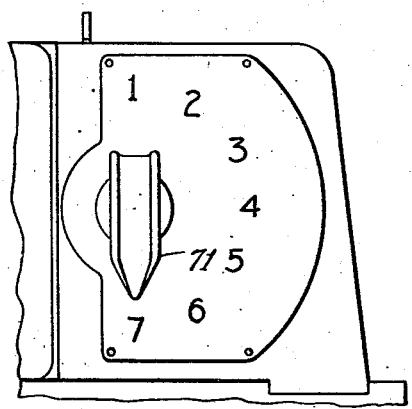
Figure 7:
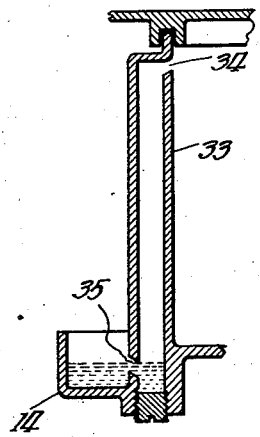

Referring to the drawings forming part of the specification and illustrating a preferred embodiment of our invention, Fig. 1 is a vertical section of the control unit, Fig. 2 is a plan view of the top cover of the control, Fig. 3 is a reduced side elevation of the unit with the upper portion thereof broken away, Fig. 4 is a detail of a manually operated controlling element, Fig. 5 is a detail of a thermostatically operated controlling element, Fig. 6 is a detail of the manual controlling knob and dial arrangement of the controlling element shown in Fig. 4, and Fig. 7 is a detail section of an air supply line communicating with the metering chamber of the unit taken on the line 7—7 of Fig. 3.

Referring to the drawings and particularly Fig. 1 reference numeral 10 indicates in general a casing member for the control unit. The casing member 10 comprises a relatively large metering chamber 11 having a depending portion 12 and an auxiliary casing portion 13 integral therewith. The casing portion 13 is provided with a valve chamber in the body thereof and a trough-like portion 14 located just above the valve casing portion. The valve casing communicates with the metering chamber at the bottom thereof by means of a port 15 and with the trough by means of a port 16. A port 17 is also provided in the valve casing which is adapted to be connected to any suitable source of liquid fuel, such as a kerosene tank or the like.

Mounted in the valve casing for limited vertical reciprocating movement is a valve core 18 provided with two conical portions 19 and 20 and a valve stem or operating member 21. In the position shown in Fig. 1, the valve core and stem are in their lowermost position and the conical portion 20 is effective to prevent communication between the ports 15 and 17. When moved to its uppermost position, the conical portion 19 of the valve core 18 prevents communication between the ports 16 and 15.

The metering chamber is provided with a cover 22. A groove 23 extending circumferentially about the lower face of the cover 22 cooperates with the upper end of the walls of the chamber 11 and may be provided with an annular packing member effective to establish an airtight seal for the chamber 11. Depending and integral with the cover 22 is a well 24. The well 24 is provided with an opening 25 at its lower end which is adapted to permit the entry of an operating member 26 into the lower portion 12 of the metering chamber. Surrounding the well 24 is a float 27 provided with a downwardly extending tubular member 28. The tubular member and float are capable of a reciprocating motion within the metering chamber 12 and the portion 11, respectively.

Ribs 29 formed on the outer surface of the well 24 and ribs 30 formed on the inner surface of the depending portion 12 function as guides for the tubular member during its upward and downward motion. The lower end of the tubular member 28 is provided with a seat 31 adapted to receive and cooperate with the operating member 26. Openings 32 are provided in the lower end of the tubular member in order to permit free access of liquid to the interior of the well 24.

The casing 10 is also provided with an integral offset bore 33 opening at its upper end into the metering chamber 11 and at its lower end into the trough 14 by means of the ports 34 and 35, respectively, for a purpose to be hereinafter described. The port 35, as shown in Fig. 7, is slanted at a considerable angle from the horizontal. The trough 14 is provided with an overflow outlet 36 which is adapted to be connected to a liquid fuel burner of a conventional type. It is to be noted that the inlet to the port 36 is located at a lower level than at least most of the port 35. The trough 14 is also provided with an outlet 37 having an inlet end located at a height above the inlet to the port 36.

The cover 22 is adapted to be fastened to the casing 11 by means of screws 38 passing through openings in the cover and cooperating with threaded ears 39 formed on the casing 11. The cover 22 is also provided with a pair of integral opposed members 40 and 41 which are adapted to form a support for the control mechanism proper. A suitable cover 42 is adapted to extend over the two opposed members so as to provide a dustproof casing for the control mechanism.

The control mechanism proper consists of a main bell crank lever 43 pivoted on a floating pin 44. The pin 44 is supported at each end by a bridge lever 45 which is in turn pivoted on a pin 46 supported at each end by the supporting members 40 and 41, respectively. The bell crank lever 43 serves to support the operating member 26 which is loosely connected thereto and is also provided with a downwardly extending tail 47 loosely connected, as at 48, to an operating link 49. The other end of the operating link 49 is loosely connected, as at 50, to a depending portion 51 of a toggle lever 52. The toggle lever 52 is also pivoted on the pin 46, and, as shown in Fig. 1, the right end thereof is in its lowermost position and resting against the stop 53 carried by the cover 22. It is to be understood that the toggle lever 52 is capable of a rotational or swinging movement about the pivot or pin 46.

The toggle lever 52 is also provided with an upwardly extending thrust member 52a for a purpose to be hereinafter set forth and with a pivot 54 which is adapted to receive one end of toggle spring 55. The other end of the spring 55 or lefthand end, as shown in Fig. 1, is carried by a pivot member 56 on the righthand end of lever 57. The lever 57 is also pivoted on the pin 46 and at its lefthand end carries a nut 58 which is adapted to be received on the threaded end 59 of the valve operating rod 21. Also pivoted on the pin 46 is a relatively flat lever 60 linked at one end to an upwardly extending thrust member 61 and carrying a gear sector 62 at its other end.

A laterally extending lug 63 extends from the lower edge of the lever 60 which cooperates with an angular pawl detent 64 also pivoted on the pin 46. Pivoted on the toggle lever 52 at 65 is a pawl 66 adapted to cooperate with the gear teeth 62 carried by the lever 60 except when held out of engagement by the detent 64. The pawl 66 is provided with a tail 67 which is adapted to cooperate with a stationary hook or stop 68 when the assembly of the pawl and toggle lever is moved in an upward direction.

The bridge lever 45 may be adjusted or moved in an upward or downward direction by the gear segment 69 integral therewith which cooperates with a gear 70 which in turn is moved by the pointer 71. If an ambient control is incorporated in the device, the bridge lever 45 is linked to a thrust member 72 which may be moved in an upward or downward direction by an ambient power bellows 73. The ambient bellows is actuated by a fluid filled bulb 74 exposed to the temperature of the room in which the refrigerator being controlled is operated, in a manner well known in the art.

The thrust member 61 is supported at its lower end by a spring 75 which normally tends to move the thrust member 61 in an upward direction. The downward movement of the thrust member 61 is limited by a screw-threaded rod 76 carried by the cover 22. A nut 77 may be moved upwardly and downwardly on the screw-threaded rod 76 in order to vary the tension of the spring 75. The thrust member 61 is provided with a socket 78 in its upper end which is adapted to receive an actuating member 79 of the thermostatic power element or bellows indicated in general at 80.

The thermostatic power element may be of any suitable type and forms no part of the present invention. It is not believed necessary, therefore, to describe the same in detail.

It is to be understood that the thermostatic power element 80 communicates as by a tube 81 with a bulb 82 which is exposed to the temperature of the evaporator of a refrigeration unit. It is to be further understood that when the temperature in the evaporator of the refrigeration unit rises, the thermostatic power element expands and moves the member 79 in a downward direction, and, that when the temperature in the evaporator becomes lower, contraction of the power element will permit the member 79 to move upwardly under the influence of the spring 75.

Operation of the control device is as follows:

In the position shown in Fig. 1, the various parts are shown in the positions they will assume during the burner operation. The conical portion 19 of the valve 21 is in its lower position and fuel is flowing from the metering chamber 11 through the port 15, port 16, trough 14 and outlet 36 to the burner of the unit. It is to be understood that the desirable level of fuel in the burner is somewhat above the level of the inlet 36 and the port 35. It is obvious that if the fuel level in the burner is above this point, the port 35 is liquid-sealed and no air will be supplied to the chamber 11 through the port 34 and the bore 33. The sealing of the bore will thus create a partial vacuum in the chamber 11 when any fuel flows therefrom. Because of this vacuum no fuel will flow from the chamber as long as the level in the burner is above the level of the port 35. When the level in the burner is below that of port 35, air will enter the port and be supplied to the chamber permitting further fuel flow. The slanting of the port 35 serves to make this action somewhat less critical.

When a substantial amount of the fuel in the chamber 11 has been thus fed to the burner, the float 27 will be lowered and the seat 31 on the tubular portion 28 will be moved away from the operating member 26, thus preparing the float and operating member 26 for a new cycle of operation as will be hereinafter described.

The evaporator of the unit will also become warmer during burner operation (generating period) and the corresponding heating of the thermostatic bulb 82 will cause an expansion of the thermostatic power element 80 and a movement of the thrust member 61 in a downward direction. The ratchet member or lever 60 is thus rotated about the pin 46 in a counterclockwise direction and the lug 63 on the ratchet member will move the detent 64 in a counterclockwise direction to release the pawl 66. The pawl 66 will then drop into engagement with the ratchet member. It is to be noted that at this time the ratchet member is in such a position that the pawl 66 will contact the smooth portion of the ratchet member to the lower right of the ratchet teeth so that as the temperature in the evaporator continues to rise, the pawl will not hinder the rotation of the ratchet member in a counterclockwise direction.

The feeding of all the fuel in the chamber 11 to the burner will cause the burner to cease operation and the refrigerating or evaporation period will then start in a manner well known in the art. The cooling of the evaporator of the refrigerator unit will cool the fluid in the bulb 82, causing the thermostatic power element 80 to contract and allowing the thrust member 61 to move upwardly. This upward movement of the thrust member 61 will cause the lefthand end of the lever 60 to move in an upward direction and the righthand end to move downwardly clockwise.

During this movement, the pawl will ride over the teeth 62 on the ratchet member until, when a comparatively low temperature in the evaporator is reached, the pawl will have reached the bare section to the left of the ratchet teeth and will continue to ride on the bare section during any further lowering of the temperature. When all of the refrigerant in the evaporator has been evaporated, the temperature thereof will rise, and when a certain predetermined temperature has been reached, the corresponding counterclockwise movement of the lever 60 and the gear teeth 62 will move the pawl in a counterclockwise direction. This movement of the pawl will be transmitted through the pivot 65 to the toggle lever 52 and from the toggle lever to the righthand end of the toggle spring 55. As soon as the righthand end of the spring has gone past dead center, the left hand end of the spring 55 and the righthand end of the lever 57 will jump downwardly raising the lefthand end of the lever 57, the nut 58 and the valve stem 21. This movement of the valve stem will cause the conical portion 19 to close the port 16 and will open communication between the port 17 and the port 15. Fuel will then be fed through the ports 17 and 15 into the metering chamber 11.

As the metering chamber 11 fills with fuel, the float 27 will rise carrying with it the tubular member 28 and the seat 31. At a predetermined point, the seat 31 will lift the operating member 26 and through it the lefthand end of the main lever 43. The lifting of the lefthand end of lever 43 will cause the lever to rotate in a clockwise direction about the pivot 44 and will move the link 49 in a lefthand direction, as seen in Fig. 1. Movement of the link 49 to the left will cause the toggle lever 52 to move about the pivot 46 in a clockwise direction. The movement of the toggle lever will move the pivot 54 thereon in a similar manner and as soon as the righthand end of the toggle spring 55 has been moved past dead center, the lefthand end thereof and the pivot 56 will be caused to jump upwardly. This upward movement of the righthand end of the lever 57 will lower the lefthand end thereof and restore the valve 18 to the position shown in Fig. 1, thus starting a new cycle of operation.

The movement of the toggle lever 52 in a clockwise direction about the pivot 46 will move the member 52a on the lever and the engagement of the upper end of this lever with the detent 64 will serve to raise the pawl 66 to the position shown in Fig. 1.

The point at which the seat 31 becomes operative upon the lever 26 can be varied by raising or lowering the pivot 44. This is effected by the manual rotation of the handle 71 and the gear 70 in the modification shown in Figs. 4 and 6. Obviously a rotation of the gear 70 will move the rack 69 in an upward and downward direction, and, since the rack 69 is a part of the bridge lever 45, this movement will lower or raise the pin 44, the main lever 43 and the operating member 26.

In the modification shown in Fig. 5, this movement of the bridge lever 45 is effected by an ambient control or power member 73. An expansion of the power member due to higher temperatures in the room surrounding the refrigerator will raise the bridge lever 45 and therefore a greater quantity of fuel and a higher level of the float 27 will be reached before the seat 31 actuates the operating member 26.

Various modifications and changes coming within the spirit of our invention may suggest themselves to those skilled in the art, and, hence, we do not wish to be limited to the specific forms shown or uses mentioned except to the extent indicated in the appended claims, which are to be interpreted as broadly as the state of the art will permit.

We claim:

1. In a control mechanism for a liquid fuel burner, a casing having a relatively large metering chamber, a laterally extending member having an upper trough-like portion and a valve casing depending therefrom, said valve casing having one port opening into the trough-like portion, a second port opening into the lower portion of the metering chamber, and a third port communicating with a source of liquid fuel, a valve core operative in one position to connect the second and third ports to feed fuel into the chamber and in another position to connect the first and second ports to discharge fuel from the chamber into the trough-like portion, an outlet for said trough-like portion and means to limit the flow of fuel from said chamber into said trough-like portion in accordance with the flow from said trough-like portion through said outlet.

2. In a control mechanism for a liquid fuel burner, a casing having a relatively large metering chamber, a laterally extending member having an upper trough-like portion and a valve casing depending therefrom, said valve casing having one port opening into the trough-like portion, a second port opening into the lower portion of the metering chamber, and a third port communicating with a source of liquid fuel, a valve core operative in one position to connect the second and third ports to feed fuel into the chamber and in another position to connect the first and second ports to discharge fuel from the chamber into the trough-like portion, and communicating means opening into the upper end of the metering chamber and into the trough-like portion adjacent the bottom thereof.

3. In a control mechanism for a liquid fuel burner, a casing having a relatively large metering chamber, an integral laterally extending member having an upper trough-like portion and an integral valve casing depending therefrom, said valve casing having one port opening into the trough-like portion, another port opening into the lower portion of the metering chamber and a third port communicating with a source of liquid fuel, a valve core operative in one position to connect the second and third ports to feed fuel into the chamber and in another position to connect the first and second ports to discharge fuel from the chamber into the trough, and a laterally offset integral bore opening into the trough-like portion at its lower end and into the chamber at its upper end.

4. In a control mechanism for a liquid fuel burner, a casing having a relatively large metering chamber, a laterally extending member having an upper trough-like portion and a valve casing depending therefrom, said valve casing having one port opening into the trough-like portion, a second port opening into the lower portion of the metering chamber, and a third port communicating with a source of liquid fuel, a valve core operative in one position to connect the second and third ports to feed fuel into the chamber and in another position to connect the first and second ports to discharge fuel from the chamber into the trough, a vertically extending well depending from said cover into said metering chamber, an operating member extending into the chamber through said well, means responsive to level changes of the liquid in the chamber to move the operating member, a valve operating member extending from said valve core, and means carried by said cover to operatively connect the first operating member and the valve operating member to move the valve into the second mentioned position when a predetermined level of liquid is reached in the metering chamber.

5. In a control mechanism for a liquid fuel burner, a casing having a relatively large metering chamber, a cover for said chamber, a laterally extending member having an upper trough-like portion and a valve casing depending therefrom, said valve casing having one port opening into the trough-like portion, a second port opening into the lower portion of the metering chamber, and a third port communicating with a source of liquid fuel, a valve core operative in one position to connect the second and third ports to feed fuel into the chamber and in another position to connect the first and second ports to discharge fuel from the chamber into the trough, a vertically extending well depending from said cover into said metering chamber, an operating member extending into the chamber through said well, a float surrounding the well and having a depending member provided with a seat for said operating member and effective to move the operating member when a predetermined level of liquid is reached in the chamber, a valve operating member extending from said valve core, and means carried by said cover to operatively connect the first operating member and the valve operating member to move the valve into the second mentioned position when a predetermined level of liquid is reached in the metering chamber.

6. In a control mechanism for a liquid fuel burner, a casing having a relatively large metering chamber, a laterally extending member having an upper trough-like portion and a valve casing depending therefrom, said valve casing having one port opening into the trough-like portion, a second port opening into the lower portion of the metering chamber, and a third port communicating with a source of liquid fuel, a valve core operative in one position to connect the second and third ports to feed fuel into the chamber and in another position to connect the first and second ports to discharge fuel from the chamber into the trough-like portion, a float in said metering chamber and means to operatively connect said valve core with said float to move the valve core into said second mentioned position upon a predetermined movement of said float.

JOHN LITHGOW.
LESLIE K. JACKSON.
EARNEST J. DILLMAN.